Figure 1:
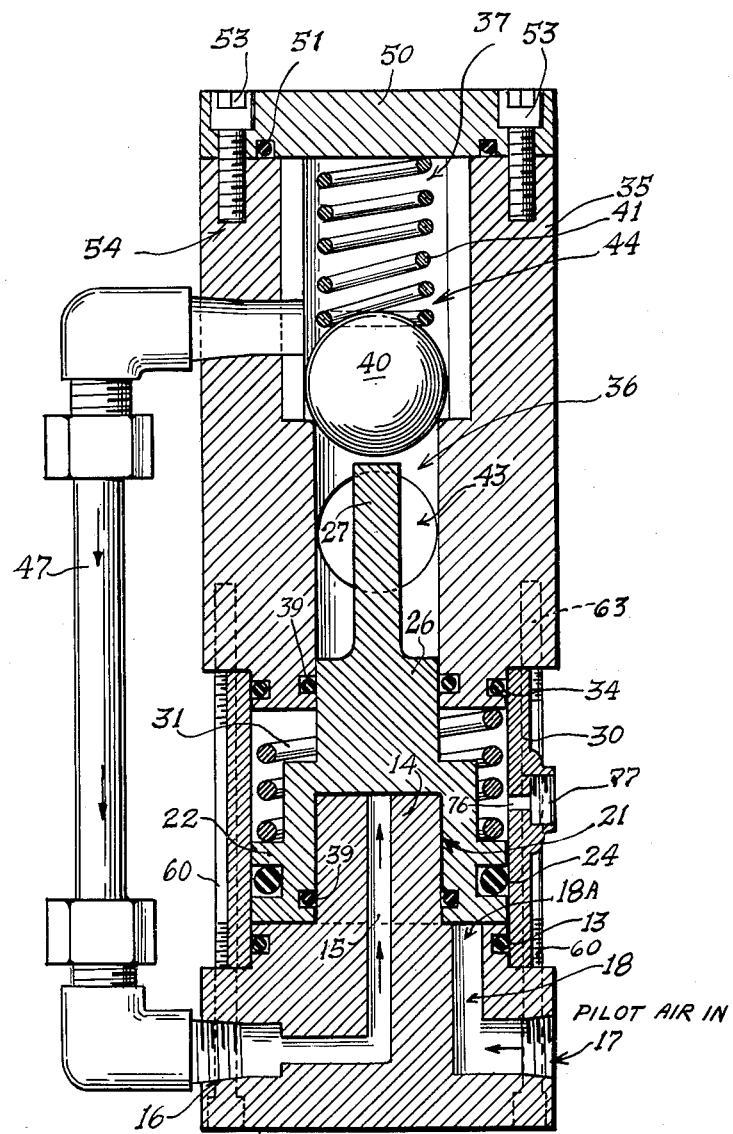

INVENTOR.
DON R. HOXWORTH
BY
HIS ATTORNEY.

April 10, 1962  D. R. HOXWORTH  3,029,061
AIR-HYDRAULIC CONTROL UNIT
Filed July 16, 1959  2 Sheets-Sheet 2

INVENTOR.
DON R. HOXWORTH
BY
HIS ATTORNEY.

United States Patent Office 3,029,061
Patented Apr. 10, 1962

3,029,061
AIR-HYDRAULIC CONTROL UNIT
Don R. Hoxworth, 1623 N. 32nd Ave., Melrose Park, Ill.
Filed July 16, 1959, Ser. No. 827,551
7 Claims. (Cl. 251—62)

This invention has as its principal object the provision of an air-hydraulic control unit of general application in a wide variety of control arrangements wherein the flow of a high-pressure liquid, such as oil, may be controlled by a fluid, such as air or oil, at much lower pressures, the control unit being very compact, rugged, and economical to build, and being adaptable to easy installation in various hydraulic systems for actuating presses, rams, vises, clamps, and the like.

The present disclosures relate broadly to air-hydraulic devices of the type described in a related copending application, Serial No. 667,212, now Patent No. 2,979,903 of April 18, 1961, which pertains to hydraulic presses and the like.

More particular objects of the present invention relate to the provision of an air-hydraulic control unit including a compound piston means co-acting with a complex cylinder structure which provides in a single unit a plurality of hydraulic (or air-hydraulic) displacement zones, one of which utilizes low-pressure pilot air to unseat a ball check and thereby control the flow of high-pressure working oil through an independent control chamber, and others of which are utilized to by-pass released high-pressure oil to counter-balance the back pressure of the released oil against the ball check, so that the only force needed to maintain the ball check in open condition is the relatively low-pressure pilot air utilized to initiate the release of the high-pressure oil in the first instance.

Stated in other terms, the novel control unit employs a very simple ball check valve to release high-pressure working oil, the back-pressure of which, once-released, would ordinarily be enormously greater than the pilot control pressure, and would therefore require an increasing pressure on the pilot air line or some other expediency to keep the oil line open for the novel constructions hereinafter disclosed providing a sustained low-pressure pilot control achieved by reason of a number of features including a compound piston means and special by-pass and release operations thereof, which balances out the back pressure upon initiation of the high-pressure oil flow, and which also permits full hydraulic or air-hydraulic control in both opening and closing functions of the device, as desired.

Still more particularly, the special construction and configuration of the compound piston means makes it possible by the simple omission of a return spring, and the optional connection of low-pressure fluid (oil or air) into a certain air relief port to restore the piston means to a normalized off position, together with a fluid-control circuit for actuating the air-hydraulic unit as aforesaid.

Figure 2:
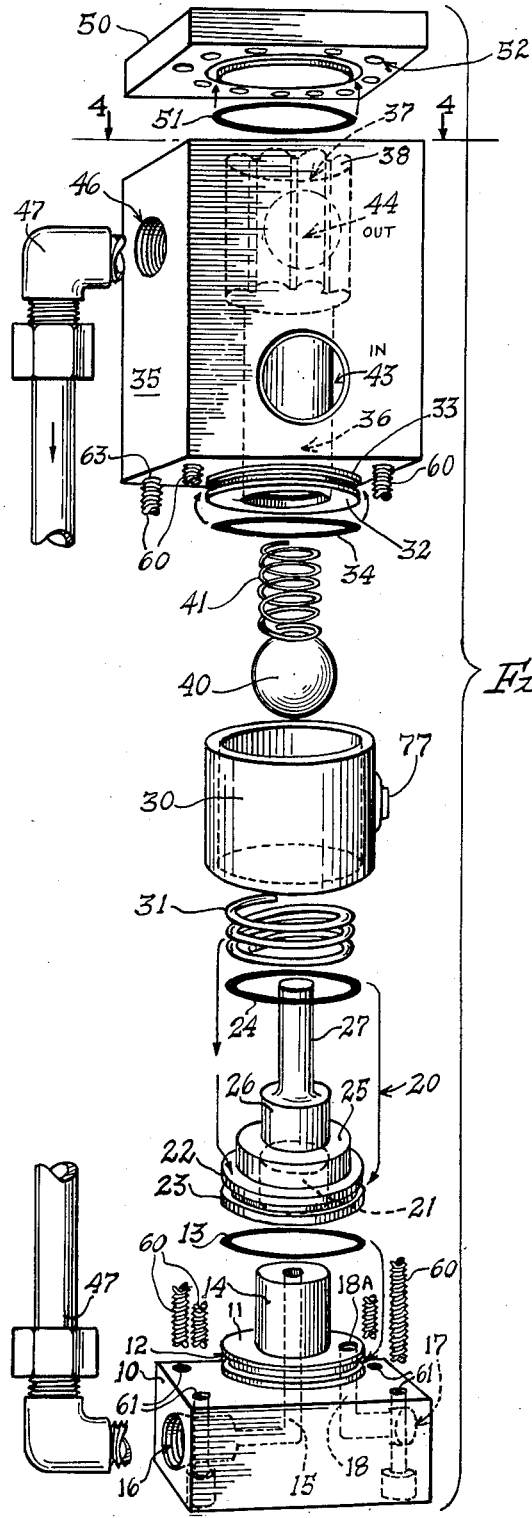
Figure 3:
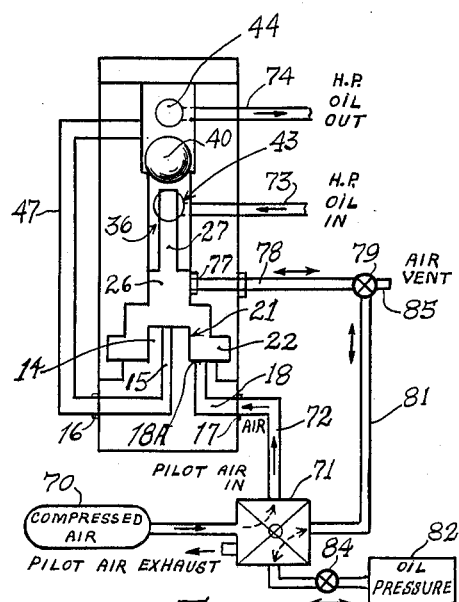
Figure 4:
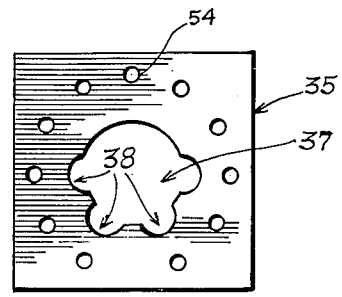
Figure 5:
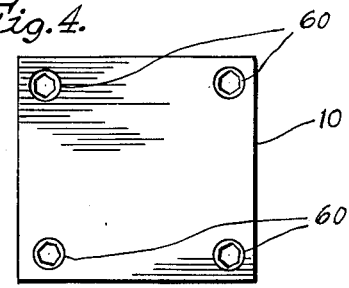

Additional objects and aspects of novelty and utility relate to details of the construction and operation of the embodiment of the device described hereinafter in view of the annexed drawings, in which:

FIG. 1 is a vertical section of the control unit;
FIG. 2 is an exploded perspective of the unit shown in FIG. 1;
FIG. 3 is an operating diagram;
FIG. 4 is a top plan detail of the cylinder head showing the configuration of the ball race;
FIG. 5 is a plan detail of the base block.

The novel control unit is shown in assembled condition in FIG. 1 and ready for connection into a desired fluid control circuit, the component parts of the device being best understood in view of FIG. 2 and comprising a base block 10 having a machined cylinder seat 11 in which is a ring groove 12 receiving an O-ring 13. A stationary cylindrical post 14 projects upwardly from the seat and is drilled to provide an oil passage 15 communicating with an inlet 16 in one side of the block, there being another inlet 17 on the opposite side of the block communicating with a passage 18 for pilot air, which emerges into the main cylinder through a port 18A in the said cylinder seat.

A composite piston 20 has an internal bore 21 fitting upon the piston post 14, and also has a piston skirt 22 provided with a ring groove 23 to receive an O-ring 24.

Above the piston skirt is a shoulder 25, the purpose of which will appear hereafter, and projecting upwardly from the shoulder is a reduced upper piston section 26, and projecting a substantial distance above the latter is a ball plunger 27.

The aforesaid piston structure 22—27 works in a cylinder in the form of a cylindrical sleeve 30 which fits down upon the seat 11 where it is sealed by the ring 13 (see also FIG. 1). The skirt portion 22 of the piston structure works in said sleeve sealed by ring 24, and is normally pressed to its bottom limit on the seat by a compression spring 31.

At its upper end the cylinder sleeve is fitted onto an upper block seat 32 grooved as at 33 to receive the O-ring 34, said seat being formed as part of the large upper block 35 in which there is formed a liquid bore 36 of large diameter adapted to receive slidably the upper piston section 26 which is sealed by an internal O-ring 39.

The upper terminus of said bore communicates with a still larger bore constituting a ball race 37 having a plurality of relief cuts 38 (FIG. 4) formed in portions of its side wall to permit passage of oil or like liquid, as will presently appear, and the line of conjunction between these two block bores is suitably coined to provide a seat for a ball check 40 which can be displaced therefrom upwardly in its race against the action of a compression spring 41 normally effective to keep the ball on its seat.

Referring still to FIG. 2, a large inlet 43 is provided in one side of the upper block to admit high-pressure oil into the bore 36 behind the ball check 40, and when the ball is unseated this oil can pass into the race 37 and out the exit port 44 which is situated at a higher level on the opposite side of the block.

On a third side of the upper block is a smaller by-pass duct 46 which also communicates into the ball race chamber and is connected by by-pass piping 47 to the inlet 16 in the bottom block.

At its top the upper block is closed off by a head 50, which has an annular groove cut on its underside to seat an O-ring 51, and is bored with bolt holes 52 for head bolts 53 (FIG. 1) threading into the tapped holes 54 in the top of the block, as seen in FIG. 4.

The assembled cylinder and block members are secured together by long tie bolts 60 (FIG. 5) which have their heads seated in the underside of the lower block 10 and passing upwardly through holes 61 therein, thence outside of the cylinder tube to thread into tapped bores 63 in the upper block.

In operation, the control unit may be utilized in any air-hydraulic system wherein it is desired to control high-pressure liquid, usually oil, at working pressures from about 3,000 to 5,000 p.s.i. by means of a low-pressure air control circuit at pressures of about 80 p.s.i.

FIG. 3 presents a simple diagram illustrative of a type of fluid circuit which may be employed, wherein compressed air from a source 70 is admitted through a four-way valve 71 to line 72 connecting into the air pilot inlet 17 in the lower block (FIG. 1) to rise through passage 18 and emerge from port 18A to act against the underside of the large piston skirt 22 thus displacing the entire compound piston member against spring 31, as a result of which the rising ball plunger 27 impinges upon, and unseats, the ball check so that high-pressure oil from the usual source line 73, entering port 43, passes around the ball easily via reliefs 38 (FIG. 4) and out the line 74 to the desired utilization means, which may be a hydraulic ram (not shown) or the like.

The high-pressure action will be sustained owing to the fact that the high-pressure oil in the ball chamber 37 also acts in the by-pass line 47 and enters behind the piston means at port 16 in the lower block to rise through duct 15 and act internally of the piston in the bore 21 above post 14, the diameter of which, including its bore 21, is the same as that of the upper-block bore 36, by reason of which the oil pressure acts in opposition on both sides of the piston means to produce a zero resultant force so that the ball check will remain unseated with the high-pressure line open and no further increase in application of air pressure needed for this purpose.

The aforesaid "open" or working condition of the control will be sustained until the ball check can be caused to reseat under action by its spring 41. This will be achieved by manipulating the fourway valve 71 to shut off the air supply to line 72. Movement of air trapped in the upper portion of the main cylinder occupied by return spring 31 is permitted by means of a small duct 76 (FIG. 1) in the side wall of the cylinder and provided with a tapped nipple coupling 77.

In those installations where a full hydraulic return is desired, the spring 31 will be omitted and an oil relief line 78 will be connected from 77 through a two-way valve 79 for connection via line 81 and the fourway control valve means 71 to a source 82 of oil pressure connecting to said control valve means through a suitable shut-off valve 84. By closing the latter valve and setting the two-way valve 79 to close off the oil line 81 and open the vent at 85, the control unit may be operated optionally by spring return if the spring means 31 is installed in the cylinder, or if it is removed, by setting the valves 79 and 84 for oil return, it being understood also that air return may be employed under the same conditions, if desired, simply by substituting a source of air pressure for the oil-pressure source 82 and removing the spring 31, as aforesaid, this being regarded as a "full air-pilot operation."

It will be recognized that the device is adaptable to control arrangements other than that described in the schematic view of FIG. 3 for purposes of illustration, so as to take advantage of the simple pilot control functions of the compound piston means and by-pass balancing of opposing hydraulic pressures in order that low pilot pressures may be reliably used. One such arrangement, for example, may be effected by simply reversing the directions of pressures applied at ports 73 and 74 so that high-pressure oil is admitted to port 74, instead of to port 73, thereby acting in a sense tending to seat the ball valve 40 still more firmly and at the same time by-passing via line 47 and exerting pressure against the compound piston means at 15 to raise the latter slightly until it engages the ball and the pressures become balanced in the manner previously explained; so that when pilot air is applied via duct 72, the piston can easily unseat the ball (as in the previously-described operation according to FIG. 3), the high-pressure oil then passing into the lower chamber 36 and out through port 43 into the utilization line or other desired part of the system, this flow condition persisting, as in the operation of FIG. 3, until such time as the piston is restored to retracted position either by withdrawal of the pilot air and action of the spring 31 or application of fluid pressure at port 77, whichever means of applying return pressure is adopted.

The several advantages of the improved control device may be realized without adherence to the precise mode of construction of the preferred embodiment shown, and it is the intention that the invention shall embrace all changes in form of construction, arrangement, and connection of parts of the control unit fairly contemplated within the scope of the appended claims.

I claim:
1. An air-hydraulic control unit comprising means providing a high-pressure oil chamber having an inlet and an outlet and spring-loaded ball check valve means interposed in normally seated condition between said inlet and outlet to close off the flow of high-pressure oil from the inlet to the outlet; a compound piston having a plurality of separate pressure areas and complementary cylinder means therefor providing a like plurality of pressure zones and conjoined with said first-mentioned chamber means a part of said unit with said piston displaceable therein relative to said zones in alignment with the axis of opening and closing movement of said ball check valve; means movable with said piston in displacement from a normally retracted position of rest by pilot pressure acting on a first one of said pressure areas in a first one of said zones to engage the ball check and unseat the same and permit flow of high pressure oil from a second one of said zones communicating with said inlet to a third zone communicating with said outlet, said unit including duct means adapted for connection with a source of pilot air to direct such air to said first zone and displace the piston from normal position and unseat the ball check as aforesaid; spring means acting on said piston in opposition to said pilot pressure and yieldingly urging the piston into said normal position; and means for by-passing high pressure oil from said third zone to a fourth zone to act on the piston in opposition to the pressure acting in said second zone, said piston having pressure areas in said second and fourth zones of relative magnitude to nullify the effect of the high-pressure oil thereon by causing high-pressure forces to act equally in opposition thereon whereby to minimize the pilot pressure needed to maintain the check valve open.

2. An air-hydraulic control valve comprising as parts of a unitary structure: a high-pressure oil chamber having inlet and outlet ports; a spring-loaded ball check valve normally operative to close off flow of high-pressure oil between said ports; a cylinder structure; a control piston working in said cylinder structure and having a primary working face of predetermined pressure area working in a first cylinder cavity in said cylinder structure collinearly with the direction of seating and unseating displacements of the ball check valve and having a projection engageable with said ball check valve to unseat the same in certain movements from a normal position; piston return means acting on said piston to urge the same in the absence of opposing action of pilot fluid thereon to said normal position away from said ball check valve to permit the latter to seat and close off flow of high-pressure oil between said ports, said unit having duct means adapted for connection to a source of low-pressure pilot fluid and disposed to direct the latter in action against a pilot working face of said control piston in a direction to displace the same from said normal position and unseat the ball check valve as aforesaid; a secondary cylinder cavity formed within said control piston and working with a stationary secondary piston with respect to which said control piston moves codirectionally with the aforesaid certain ball-check valve actuating movements thereof; said unit including by-pass means for directing high-pressure oil from a high-pressure zone in said chamber which is beyond said ball check vale toward the outlet port, back through said stationary piston means to act on the control piston in the secondary cylinder cavity thereof in a direction opposing the force of the released high-pressure oil against said control piston in the return direction, the pressure working areas of said control piston in said high-pressure zone and said secondary cavity being effectively equal to balance out the effect of high-pressure oil on the control piston when the ball check is unseated and thereby lessen the pilot pressure required to maintain the last-mentioned condition.

3. A control valve according to claim 2 in which said piston return means comprises the provision of a third cylinder cavity as part of said cylinder structure, said cavity being sealed off from said first and secondary cylinder cavities, and said piston being provided with a third piston means working in said third cylinder cavity co-directionally with the first and secondary piston, there being provided a further duct means communicating into said third cylinder cavity to admit fluid under pressure thereto in a direction to drive said third piston means and move the entire piston structure back to said normal retracted position.

4. An air-hydraulic control unit comprising: a base block, an upper block, a main cylinder between said blocks, a movable compound piston having a skirt piston working in said main cylinder and having an upper piston working in an upper cylinder bore in said upper block together with an internal cylinder bore overlying the base block; a fixed piston projection on the base block working with said internal cylinder, all said cylinder and piston parts being coaxially aligned relative to the axis of piston displacement; a ball race in the upper block coaxially aligned with the piston displacement axis and communicating coaxially into said upper cylinder; a ball check in said race with spring means normally seating the same to close off said upper cylinder at its conjunction with said race; means projecting from the upper piston coaxially of said axis for engaging and unseating the ball check when said movable piston is displaced a predetermined amount from said normal position; means for urging said movable piston into said normal position; port means providing a high-pressure fluid inlet into said upper cylinder on one closed side of the ball check and a high-pressure fluid outlet from said ball race on the opposite outlet side of the ball check for control by the latter of high-pressure working fluid; port and duct means connecting from said ball race at the outlet side of the ball check back into said base block and through said fixed piston to expose the latter to high-pressure fluid when said ball check is unseated; port and duct means in said base block for connecting pilot control fluid for egress beneath the skirt of said movable piston to displace the same in said main cyilnder from said normal position and unseat the ball check; and fluid port means communicating into said main cylinder on the opposite side of the movable piston from said skirt for ingress and egress of relief fluid.

5. A control unit according to claim 4 in which said means for urging the piston to said normal position is a spring in said main cylinder.

6. A control unit according to claim 4 in which said means for urging the piston to said normal position is a source of pressurized fluid connecting through selectively operable valve means with said relief fluid port means into the main cylinder for operation under control of the valve means to admit said pressurized fluid and force the piston into said normal position, or to permit expulsion of fluid from the main cylinder when the piston is displaced from said normal position as by action of said pilot control fluid.

7. An air-hydraulic control unit comprising means providing a high pressure oil chamber having first and second ports with a valve seat in said chamber between said ports; a ball check spring-urged normally onto said seat to close off flow between said ports; a compound piston and cylinder means therefor conjoined with said chamber means, said piston being displaceable in said cylinder means and a certain part of said chamber means along an axis codirectional with the direction of movement of the ball check in seating and unseating movements thereof; means movable with said piston in said certain part of the chamber means to engage and unseat the ball check and permit flow between said first and second ports responsive to displacement of the piston from a predetermined normally retracted position away from the ball check; said piston having four separate pressure faces each respectively exposed to one of four separate pressure zones, a first one of which faces and zones is contiguous with said certain part of the cylinder means and the seated side of the ball check, and a second one of which faces and zones comprises a pilot face and zone to be exposed to pilot pressures, and a third one of which faces and zones comprises a by-pass face and zone; and a fourth one of which faces and zones comprises a return face and zone; pilot duct means for directing pilot pressure to said pilot zone; by-pass duct means communicating from said chamber in the region of said second port on that side of the ball check remote from said seat back to said third or by-pass zone; and means for directing a force in said fourth zone to act on the piston in a direction to drive the same toward said normal retracted position, said first and second ports being respectively adapted for connection in a pressure fluid circuit to be controlled by said ball check with the aid of pilot pressure applied to said pilot duct means, and means for applying a restoring force acting upon said piston in the fourth or return zone.

References Cited in the file of this patent

UNITED STATES PATENTS

| | | |
|---|---|---|
| 2,492,873 | Lamb | Dec. 27, 1949 |
| 2,877,794 | Chasser | Mar. 17, 1959 |
| 2,887,093 | Jones | May 19, 1959 |

UNITED STATES PATENT OFFICE
CERTIFICATE OF CORRECTION

Patent No. 3,029,061                                April 10, 1962

Don R. Hoxworth

It is hereby certified that error appears in the above numbered patent requiring correction and that the said Letters Patent should read as corrected below.

Column 4, line 15, after "means" insert -- as --; same column, line 67, for "vale" read -- valve --.

Signed and sealed this 18th day of September 1962.

(SEAL)
Attest:

ERNEST W. SWIDER
Attesting Officer

DAVID L. LADD
Commissioner of Patents